No. 704,919. Patented July 15, 1902.
J. M. J. PHELAN.
MITERING AND TOOL GUIDING DEVICE.
(Application filed Mar. 11, 1901.)
(No Model.) 2 Sheets—Sheet 1.
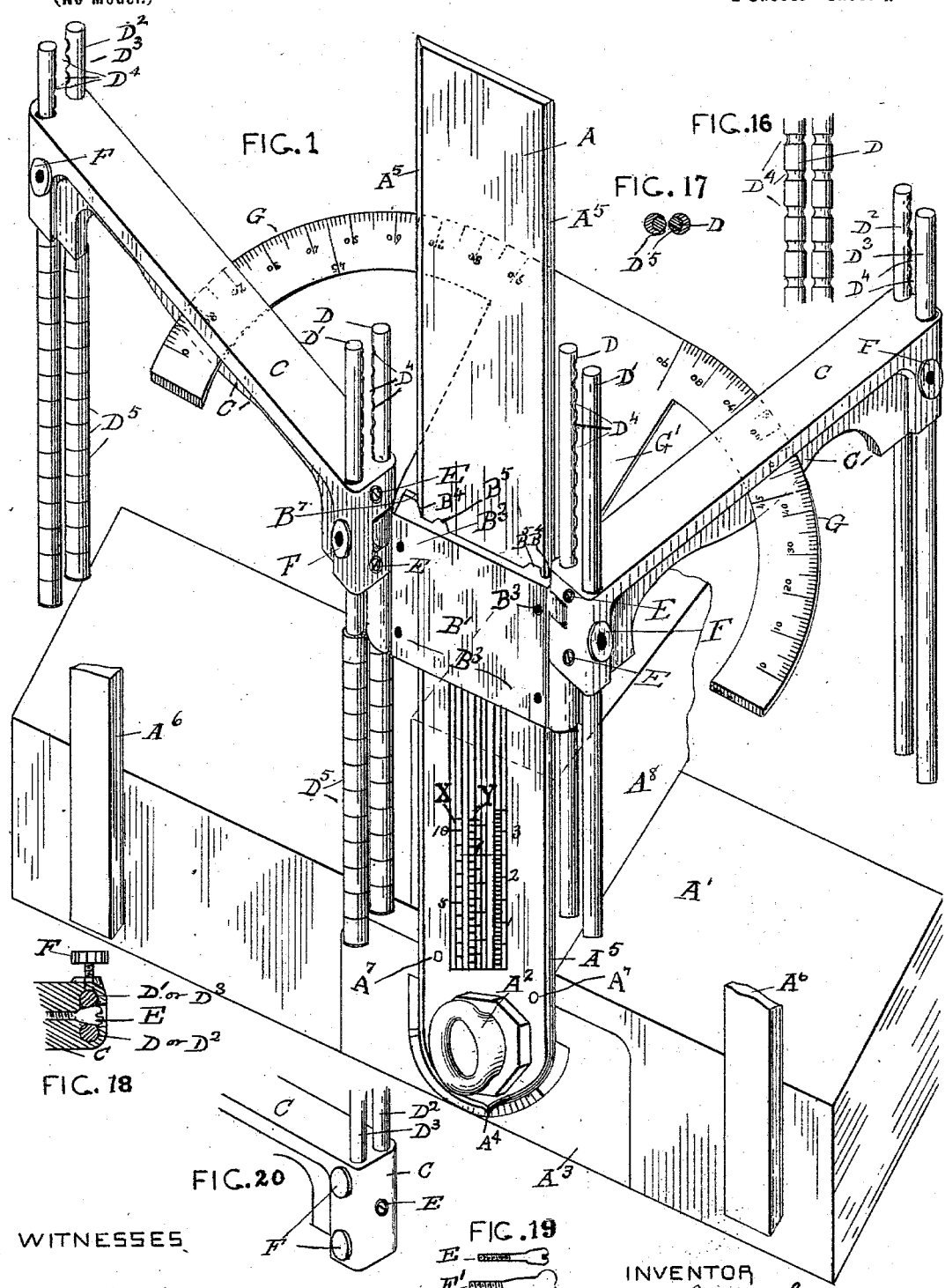
WITNESSES
INVENTOR No. 704,919. Patented July 15, 1902.
J. M. J. PHELAN.
MITERING AND TOOL GUIDING DEVICE.
(Application filed Mar. 11, 1901.)
(No Model.) 2 Sheets—Sheet 2.
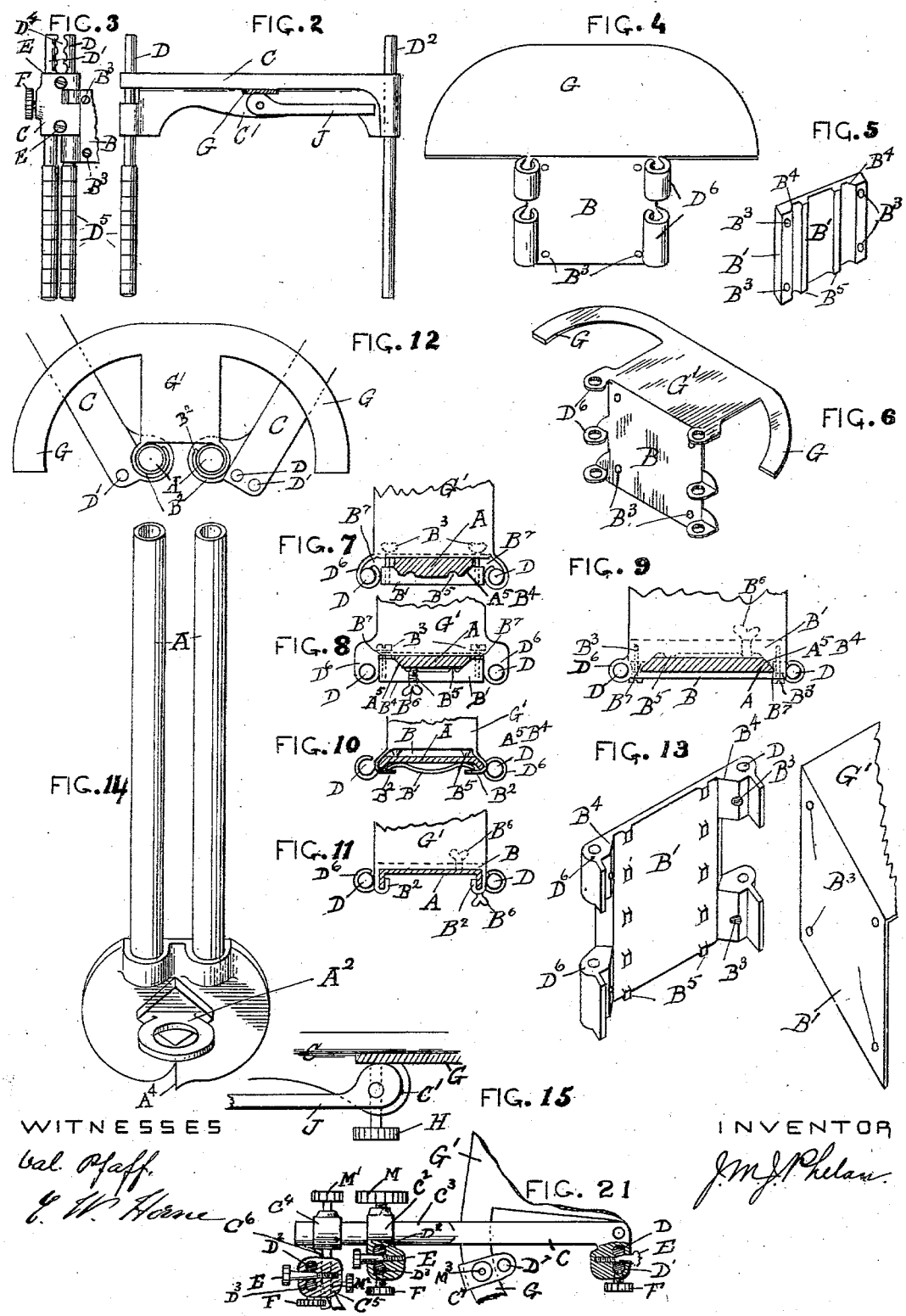
WITNESSES
INVENTOR

UNITED STATES PATENT OFFICE.

JOHN MICHAEL JOSEPH PHELAN, OF VITTORIA, CANADA.

MITERING AND TOOL-GUIDING DEVICE.

SPECIFICATION forming part of Letters Patent No. 704,919, dated July 15, 1902.

Application filed March 11, 1901. Serial No. 50,741. (No model.)

*To all whom it may concern:*

Be it known that I, JOHN MICHAEL JOSEPH PHELAN, a citizen of the United States of America, and a resident of Vittoria, Norfolk county, Ontario, Canada, have invented certain new and useful Improvements in Mitering and Tool-Guiding Devices, of which the following is a specification.

This invention embraces improvements in a mitering and tool-guiding device embodied in an application for Letters Patent filed in the United States Patent Office on the 13th day of March, 1900, Serial No. 8,547, and was allowed on January 9, 1901, and more particularly contains improvements in the collar or slide, in the means of compensation for wear by friction between the collar and standard, in the adjustability of the saw-guides to accommodate saws of different widths as well as of different lengths and thicknesses, in the hinging of the arm to the collar, and in sundry details, which though covered in a general way are not specifically so.

Reference will be made to the accompanying drawings, forming part of this specification, in which like reference characters indicate like parts in the several figures.

Figure 1 is a rear perspective of this tool-guiding and bevel-indicating device. Fig. 2 is a left side elevation of a right-hand arm. Fig. 3 is a rear end elevation of the same. Figs. 4 and 5 expose details of one form of collar or standard grasping means, which is the form shown in Figs. 1 and 3, of which Fig. 5 is the adjusting part. Fig. 6 is a modification in perspective of the part shown in Fig. 4, to which also belongs the adjusting part, Fig. 5, to complete the collar. Fig. 7 is a detail plan of the collar, of which Fig. 4 gives part. Fig. 8 is a detail plan of the form of collar for Fig. 6. Fig. 9 is a detail plan of a modified collar, showing the adjusting part, Fig. 5, as placed forward of its counterpart. Fig. 10 is a detail plan of a collar having the adjusting part formed so as to act as an automatic clamping-spring. Figs. 11 and 12 are detail plans showing collars with the rear part dispensed with, of which the collar in Fig. 11 grasps a double flanged standard and the one in Fig. 12 a double cylindrical standard. In each of Figs. 7, 8, 9, 10, and 11 a neck, (marked G' in the drawings,) partly broken away and seen in full in Figs. 1, 6, and 12, extends outward from a part B of the collar and is shown integral with this part B, but does not constitute a functional part thereof, the said part B of the collar comprising only the upright portion marked B seen in Fig. 6. Fig. 13 is a perspective of a two-part collar, illustrating the arm-hinging provision as applied to the adjusting part, Fig. 5. Fig. 14 is a somewhat perspective elevation of the double standard shown in section in Fig. 12. Fig. 15 illustrates modes of clamping the arm to a modification. Fig. 16 is a detail elevation illustrating modified tool-guiding shafts. Fig. 17 is a plan, partly in section, showing another such modification. Fig. 18, which is a plan partly in section, illustrates my preferred mode of adjusting the tool-guides to different saw thicknesses and to different saw widths. Fig. 19 shows forms of screws employed to adjust to saw thicknesses and saw widths. Fig. 20 is given in contrast with Figs. 1 and 3 to illustrate the said adjustment to different saw widths and to different saw thicknesses by a different disposition of the screws E and F to that shown in said Figs. 1 and 3. Fig. 21 illustrates an arm for adjusting to accommodate the length of the tool and for curved and spiral cuts, to be provided for later.

A standard A is secured or is securable to any desired bed A A' preferably by a single lag screw or bolt $A^2$. Although I prefer to make my standards of a thin flat metal bar, as shown in Figs. 1 and 8, it is to be understood that the standard may be of any desired form, single or multiple. Figs. 7, 10, 11, and 12 are plans, partly in section, of modified standards, Fig. 14 being an elevation of the form of standard of which Fig. 12 is the plan. Some of my reasons for preferring the doubly flat form of standard are due to the greater simplicity and efficiency of this form, it being composed of a common form of material, and to the fact that I purpose to impress important scales (not shown) upon both faces of the standard as auxiliaries to the functions of this miter-cutting and protractor-indicating device, such scales to be used more or less in connection with a manual of computations that I intend shall accompany the miter-box.

Especially I impress a foot-rule in inches and subdivisions upon the front face of the standard for convenience in placing crown and bed molding and other similar irregular stock against the standard at the proper elevation, this rule commencing at the height of the top of the bed and reading longitudinally upward therefrom. Upon the rear face of the standard I impress a foot-rule X in centigrade in exact juxtaposition to a foot-rule Y, divided into inches and subdivisions, so that hundredths of a foot can conveniently be read in inches, &c., and vice versa, to facilitate the reading in feet and inches results found in feet and decimals of a foot. In this connection the tables of lengths—such as of braces, rafters, &c., in the before-mentioned manual—are computed in feet and decimals of a foot. I have also shown properly lining up with these scales, so as to show equivalent lengths, a corresponding foot-rule divided into metric subdivisions to facilitate the instantaneous rendering or translating into the ordinary foot-rule subdivisions measurements that are given in metric subdivisions, and vice versa, such as sometimes confront the artisan in architects' specifications and drawings and elsewhere. The bolt $A^2$ for clamping the standard to the bed I prefer to make of a form that would be represented by thrusting the shank of a screw-eye into a nut or washer, so that the bottom of the eye would be embedded in the nut or washer in order to offer the facility of clamping the standard either by means of a wrench or by a small bar, such as a spike or punch. Between the standard and the bed in Fig. 1 is seen a graduated plate $A^3$ for adjusting the standard laterally to any desired angle for making hopper cuts and other complex bevels. The principal hopper cuts for the rafters and cornice of hip-roofs and the cornice cuts of crown and bed molding for roof-angles in general, polygonal roofs, &c., are given in the manual for all necessary pitches.

The bed-plate $A^3$ for greater simplicity and cheapness can be dispensed with, because the lateral slant of the standard for any hopper cut is conveniently gotten by means of an ordinary bevel set to the proper angle, as indicated on the graduated arcs to be mentioned later. A finger or index $A^4$, Figs. 1 and 14, would then also be dispensed with. Since my preferred form of standard is the flat-bar form, I prefer to bend, bevel, or curve opposite edges or faces of the standard—that is, to curve, slant, or bevel them with relation to the bed at angles other than at right angles or to employ regular stock so curved, slanted, or beveled for a purpose to be better understood later. These bevels or inclines I designate $A^5$. The standard I prefer to secure flush with the back edge of the bed, so that it may serve as central stock-guide post. Auxiliary stock-posts $A^6$ are secured to the bed on both sides of the standard, of a nature and location suggested by the immediate use to which the miter-box is to be put. I would provide other holes $A^7$ at the lower end of the standard for screws or wire nails when it is desired to hold the standard immovably rigid in a prevailing position. The bed A' and auxiliary stock-posts $A^6$ in the case of the itinerant artisan is usually to be picked up on the job; but for millwork and benchwork I will furnish these in suitable form. It is now easily understood that I anticipate any form of standard and that I prefer to adopt the simplest and most efficient. The function of the standard is to constitute a guide or track upon which the tool-guiding and bevel-indicating combination is conveyed to and from the stock or material to be cut at whatever angle the standard may be placed. The standard, therefore, is of any desired length. This bevel-indicating and tool-guiding combination comprises a collar B B', an arm or any desired number of arms C, hinged therewith, adjustable guide-shafts D, which are adjustable within or against the arm, screws E and F for the adjusting of these guides D, graduated arcs G, and means, such as screws H or levers J, for clamping each arm to its respective arc at any desired angle. (See Fig. 15.) The collar B grasps the standard A, in whole or in part, so as to be itself held and to hold the aforesaid tool-guiding combination laterally firm and immovable, while at the same time admitting of the said combination being properly slid upon the standard longitudinally of the standard. In order to constantly preserve and maintain the lateral rigidity of the combination in relation to the standard, so as to compensate for wear by friction, &c., I prefer to make the collar of two parts, one adjustable toward the other—a part B, which preferably is rigidly joined to the graduated arcs G, (illustrated by Figs. 4 and 6,) and a separable adjusting part B', (seen in various figures, but especially illustrated by Fig. 5.) I have shown the modified collar, Fig. 13, in contradistinction to my preferred collars, (illustrated by the aforesaid Figs. 4 and 6,) the plans of which latter are respectively Figs. 7 and 8, in order to illustrate modes of hinging the arms, to be explained later. In the form of collar shown in Fig. 10 the adjusting part B' of the collar is in the form of a plate of spring-steel that automatically adjusts the collar to the standard. In the collars shown in Figs. 11 and 12 the adjusting part B' is omitted as a modification of the simpler one-part collars of my former application, No. 8,547, aforesaid. In these forms of collars, Figs. 11 and 12, grasping-lips $B^2$ are adjustable against the standard by the stroke of a hammer, by screws, or by any other desired means. Both parts B B' of the collar may be molded or both may be impressed from plate. I prefer to adjust these parts B B' against the standard by means of screws $B^3$. The part B', which itself may be of one or more parts, has inclines, curves, points, or ridges B⁴, adapted to impinge against or exactly fit the aforesaid beveled edges A⁵ of the standard, so as to constantly and more or less automatically compensate for any lateral play or freedom between the collar and standard by the simple tightening of the screws B³, and thus to always maintain the aforementioned lateral rigidity of the tool-guiding combination. I prefer that the part B' of the collar shall touch the face of the standard against which placed only by points or ridges B⁵, by which means I still further facilitate the maintaining of the guiding combination in a condition of constant lateral firmness in order to insure the exact performance of its functions. The points or ridges B⁵ are also intended to lessen friction and to keep the collar from effacing the scales impressed on the standard. Should I make the adjusting part or parts B' of the collar from plate, the points B⁵ would be simply inward punchings or center punch-like projections. Should the points or ridges B⁵ not wear as quickly as the contact A⁵ B⁴ of the standard and collar, they can conveniently be made to do so by the application of a file. The points B⁵ could be made more adjustable by forming them of screws, as at B⁶, Figs. 8, 9, and 11, which could be retracted or forced in, as the case may require, as the said contact A⁵ B⁴ wears, if necessary. The dotted lines in Fig. 9 show the adjusting part B' of the collar placed in front of the part B. The collar generally is intended to be adjusted sufficiently tightly against the standard by means of the screws B³ or of the spring aforesaid to securely hold the guiding combination at any elevation on the standard at which slid, so as to prevent the combination from binding upon the cutting or marking tool of its own gravity, such that the combination will require a slight pressure of the free hand to intermittently slide it toward the tool as the latter cuts into the stock. This is particularly necessary in case of tools such as ordinary handsaws, whose widths vary from point to handle, and thus possess a wedge-like effect in their reciprocation. In fact, for cutting stock of the same uniform height the saw-guiding combination may remain constantly at the same elevation on the standard.

To admit of the adjustments of the part B' of the collar toward the part B, a space B⁷ (seen in Figs. 1, 7, 8, and 10) intervenes between these parts at the sides of the standard.

The arms C are hinged to the collar B preferably on a line with the rear face of the standard or so that the remote tool-guides D shall miss or pass behind the stock in their descent, so as to admit of the cutting-tool when operable between the guides being swung around back of the standard and parallel with the back edge of the bed, thus providing unlimited adjustability to the smallest possible angles or their supplements and by placing the stock at right angles to this remote edge of the bed their complements as well. The arms may be of any number, one or more; but I prefer to employ two arranged in an oppositely-disposed pair, so as to at once facilitate the setting to the opposite cuts of any miter and to accommodate the automatic indication of the exact miter cut of irregular angles without computation.

My former specification, application No. 8,547 aforesaid, provided for the bisection or mitering of irregular angles or those of unknown circular measure by the setting of the arms of the miter-box to the supplements of the angles when the stock is disposed parallel with the back edge of the bed. To avoid this intermediate expedient of taking the supplement of the angle, I would secure a stock-guide or fence A⁸, Fig. 1, centrally against the standard and at right angles to and across the bed. By this means the arms set to the irregular angle by a bevel or otherwise (each reading alike on its respective arc) would automatically bisect or miter the said irregular angle with relation to the stock or its fence A⁸.

I may adopt any suitable means of hinging the arm to the collar. The means illustrated in Figs. 4 and 6, of which Figs. 7 and 8 are the plans, are my preferred modes. In Fig. 12 the hinging of one arm is by a lug projecting from the arm, as in my aforesaid former specification, and the other arm is hinged to one cylinder of the double standard, in which case the collar elongated sufficiently would be part of that pair of tool-guides. In Figs. 1 to 11 the hinge-pin is one of the guide-shafts, which will be explained next. I desire to suggest here that the centers of the hinge-pins are the centers each of its respective arc G.

Any system of hinging the arms to the adjusting part B' of the collar, as illustrated by Fig. 13, would evidently be bad mechanism, for the hinge-pins should manifestly remain the centers of the arcs, which would not be the case if the hinging means were subject to adjustment eccentrically. The functions of the arms are to hold the tool-guides properly disposed and to admit of the application of means for their adjustment. The arms are also intended to act as protractor-indicators, so that the scales on an arc G can be read along a side of its respective arm or through an aperture in the arm. For convenience in setting a bevel to any degree or angle I prefer to make the sides of the arms straight and parallel. The cutting or marking tool would thus reciprocate or act parallel to the sides of the arms. In order to adjust so as to better accommodate tools of different lengths and stock of sundry widths, I prefer to make one guide-holding end of the arm in the form of a slidable bracket C², as shown in Fig. 21, so as to be adjustable toward the other guide or pair of guides D, which are disposed at or adjacent to the hinge. It sometimes becomes necessary to cut somewhat twisted or spiral cuts and even-twist miters. To facilitate this by the aid of a flexible blade, I make a near part $C^8$ of the arm cylindrical, as shown in the same Fig. 21, to admit of the slidable part or bracket $C^2$ being twisted thereon, so as to put its guides out of parallelism with the guide or pair of guides D at the other end of the arm, either to the right or left. It is often required to make a somewhat curved miter, for which I provide one or more other brackets $C^4$, having a guide-bearing part or bracket $C^5$, slidably adjustable transversely of the arm C on a preferably-curved extension $C^6$, so as to operate in its adjustment to keep the guides held by the brackets $C^2$ $C^5$ out of line with the guides at the hinge end of the arm, or I may employ a simpler one-guide bracket $C^7$, slidable on the arc G, for deflecting the cutting-tool out of the straight line to effect the same curve-cutting purpose, and I may employ one or more of both such means $C^5$ $C^7$. In this curve-cutting function one guide in each of the pairs of guides D, Fig. 21, that are the most remote from each other on the arm may usually be raised out of the way, since the saw when flexed would of its own elasticity sufficiently hug these remote guides and preserve the proper curvature. This modified arm, Fig. 21, would constitute either the regular arm of the machine or would be provided as supplemental to this regular arm. The brackets $C^2$ $C^4$ $C^5$ $C^7$ are clamped each to its respective bearing by a set-screw M M' $M^2$ $M^3$, respectively. The bracket $C^4$ may be placed on the arm either before or after the bracket $C^2$, according as the curvature is to be convex or concave.

The guide-shafts D for each arm are for general work preferably four in number, two at each end of the arm or at a proper distance apart thereon and disposed in pairs properly facing each other. Of course where the stock is wide horizontally I might dispose two or more brackets $C^2$, Fig. 21, on the arm to keep the cutting-tool firm in its reciprocation, if necessary. I distinguish these four guides by indices, thus: D D' $D^2$ $D^3$, of which D is the hinge-pin or the guide adjacent to the hinge-pin and D' is its associate guide, and $D^2$ $D^3$ are on or toward the other end of the arm at a distance from it to best accommodate the particular tool and function, $D^2$ being on the same side of the arm as the hinge-pin D and $D^3$ is its associate guide. These guides D D' $D^2$ $D^3$ are laterally held by and are adapted to slide and to be adjusted up and down each within its respective socket (or bracket) of the arm for the purpose of adjusting to tools of different widths, as well as when expedient to lower them sufficiently to prevent the saw-back touching the arm in its reciprocation, thus providing for its unimpeded action when, as is usually the case, it is not necessary to employ the arm as a safety-stop to guard against the saw-teeth coming in contact with the lower ends of the guides or their antifriction provision. The guides D $D^2$ on the same side of the arm are exactly parallel perpendicularly with the longitudinal edges of the standard and snugly fit within their sockets in the arm, so as to have no lateral play and to always maintain their said parallel relation to the standard. It is, however, sufficient for the purposes of this invention that the upright plane joining the longitudinal lines of surface of these laterally-firm guides D $D^2$, that face or are opposite to their associate guides D' $D^3$, respectively, or, which is the same thing, the upright action of the cutting-tool, be and be maintained parallel with the standard longitudinally of the standard. These other or associate guides D' $D^3$ are also firm within their sockets longitudinally of the arm; but the sockets of these associate guides are slightly elongated transversely of the arm, so as to admit of slight adjustment toward or from each its associate guide D or $D^2$, in order to accommodate cutting-tools of different and of varying thicknesses. An exception to the exact parallelism of the guides $D^2$ $D^3$ in relation to the guides D D' has been given above in connection with the arm for twisted bevels.

The aforesaid adjustment to accommodate tools of different widths and different thicknesses I prefer to effect positively by means of the before-mentioned screws E and F. The screws E operate longitudinally within the ends of the arms and between the pairs of adjacent guides D D' and $D^2$ $D^3$. (Best seen in Figs. 18 and 21.) The screws F are adapted to act more or less transversely of the arm, so as to impinge against and hold the adjustable guides D' $D^3$ firmly against the screws E, just mentioned. In Figs. 1 and 3 the screws E are shown two in number for each end of the arm, one at the upper and the other at the lower part of the end of the arm, and the screws F are one in number for each end of the arm and disposed about midway between the screws E at the same end of the arm. In Fig. 20 the numbers and relative positions of the screws E and F are reversed, such that the screws F are two in number, disposed at top and bottom of the arm, and the screw E is shown single and disposed centrally. I have a slight preference for the latter arrangement in some respects. Also there may be two or more of each screws E and F for each end of the arm. The upper part (about one-half) of each shaft is notched at intervals of, say, one-quarter inch apart, so as to form depressions $D^4$ for the reception of the heads of the screws E. These notches $D^4$ are for the triple purpose of keeping the shafts from turning in their sockets when so required, to facilitate the adjustment to tools of different thicknesses, and, more particularly, to hold the shafts D D' $D^2$ $D^3$ at any desired elevation within their sockets, so as to accommodate tools of different widths and to meet other incidental requirements of the artisan. The adjustment to tools of different lengths has been sufficiently mentioned in a preceding paragraph. The guides are preferably cylindrical, as shown, in order to admit of antifriction-spools D⁵, Figs. 1 and 3, for the purpose of reducing friction against the sides of the cutting-tool. This same effect I could obtain by other means, such as either of those illustrated in Figs. 16 and 17. In Fig. 16 the aforesaid notches D⁴ are seen to girdle the shafts and are best continued at intervals to the bottom of the shafts. This form of shaft is adapted to revolve each in its respective socket in the arms and in contact with the adjusting-screws E and F aforesaid, which screws act within said girdlings or annular depressions, and even if these guides, Fig. 16, do not revolve the lessening of contact-surface by intermittent notches necessarily lessens friction. Fig. 17 shows in plan a pair of tubular guides D with adjacent sides ground away, so as to admit of antifriction-balls therein (marked D⁵) being inserted within the tube and adapted to impinge against the sides of the cutting-tool that is passed between the guides. By employing such antifriction devices as illustrated by Figs. 16 and 17 one of these guide-shafts might not very conveniently be used as a hinge-pin, and therefore a separate hinge-pin and corresponding lug, as illustrated in my former application, No. 8,547, aforesaid, might be employed. I, however, prefer the arrangement of guides and spools shown in Figs. 1, 2, and 3.

The means by which the collar is in hinge connection with the arm has been mentioned above in a general way. The hinging-lugs D⁶ of the collars shown in Figs. 4 and 6 and in their plans, Figs. 7 and 8, as also those in Figs. 9, 10, 11, and 12, are integral parts of the same plate that constitutes the collar or the part B of the collar and may be integral strips of the plate bent around the hinge-pin, as in Fig. 4, or projecting lugs of the same plate punched to receive the hinge-pins, as in Fig. 6. As before said, these or any other form of collar-lugs can be cast integral with the collar when it is desired to produce these parts or any of them by means of casting.

The graduated arcs G have the double function of indicating in degrees or otherwise the horizontal angle or slant the arms, or rather the cutting-tool, in any position bear to the remote face of the bed or the stock to be operated upon, as well as of offering convenient facilities for clamping the arms at any desired angle. The arcs G may be entire, as shown in Fig. 4, or annular, as in Figs. 1, 6, and 11. The annular form is my choice for several obvious reasons. The arcs may be disposed above or below the arms, or the arcs may pass through. The latter is my preferred arrangement. The graduations, as shown in Fig. 1, are preferably in circular measure in the form of two oppositely-disposed quadrants, each with zero at the point indicated by the arm when parallel to the remote face of the bed or stock and with ninety degrees when the arm is at right angles to that position. For convenience in the protractor functions of this invention I number the degrees in groups both ways, one of which is not shown.

For clamping the arms to the arcs I employ any suitable clamping device, such as the thumb-screw H or the lever J shown for the entire arc modification in Fig. 15, wherein a depending rib C' of the arm is provided with the clamping device disposed below the arc, the rib C' being modified in this Fig. 15 to accommodate the unbroken form of arc as shown in Fig. 4. Fig. 2 illustrates the lever device J for clamping the annular form of the arcs F, which of course is similar and analogous to that in Fig. 15. In this Fig. 2 I have shown but the lever device J, having omitted therefrom the less efficient thumb-screw H, which, as seen, I have illustrated in Fig. 15. The arcs are preferably rigidly connected or integral with that part B of the collar with which the arms are hinged, as in Figs. 1, 3, 4, 6, 7, 8, 9, 10, and 11, and not to the adjusting part B' of the collar, as shown in Fig. 13, as may have been inferred before. I prefer to stamp the combined arcs G, the part B of the collar, and the hinging-lugs D⁶ from one continuous metal plate by a single stamping. In the annular form of arcs one or more necks G' connect the arcs G and part B.

In the above invention I have produced an essential mechanical tool that packs (standard excepted) into a space two inches by two and one-half inches by seven inches and at the same time does all that can or ever will be possible or necessary for a miter-box to do. It is limited by no size, form, or disposition of stock whatsoever.

In the following claims the word "slant" or "bevel" and derivatives, whether qualified by the word "oblique" or not, shall be used indiscriminately to include and imply the before-mentioned "bend," "bevel," "curve," "bevels," "inclines," "curves," "points," "ridges," "beveled edges," and words of similar purport that relate to the thus-designated means of compensating for wear by friction between the collar and standard provided for the purpose of maintaining the proper rigidity and alinement of the collar against the standard automatically—curve, incline, bevel, point, or ridge of the one against corresponding slant or bevel of the other.

Having now described my invention with especial reference to specific designs and a particular model, what I claim, and desire to secure by Letters Patent, is—

1. In a tool of the kind described, a standard having an obliquely-slanting edge combined with a correspondingly-slanting grasping part, one or more tool-guides connected therewith, and means for drawing the grasping part against the standard in order to maintain it firm laterally and to compensate for wear by friction; substantially as set forth.

2. In a tool of the kind described a standard having a beveled surface; tool-guiding arms in hinge connection therewith; a collar having a face that fits and impinges against the beveled surface of the standard; this collar comprising a part that contains the means for said hinging of the arms to the standard, and another part adjustable toward it, these parts being on opposing sides of the standard; and means for effecting said adjustment; substantially as described.

3. In a bevel-indicating and tool-guiding device comprising graduated arcs; tool-guiding and angle-indicating arms hinged concentrically in relation thereto; a standard having an obliquely-slanting surface; a collar slidably connected with said standard having a part rigidly joined with the graduated arcs and also with the arm-hinging means, and an adjusting part having a slant that corresponds with the slanting surface of the standard; and means for actuating the adjustment of these parts of the collar to and against the standard and its slanting surface to preserve the collar laterally rigid with relation to the standard; vacant adjusting-space being left between the parts of the collar to admit of this adjustment; substantially as described.

4. In a tool of the kind described the combination of a standard having a beveled edge; one or more tool-guides connected therewith; and a divided collar adjustably securable on said standard, said collar bearing partly against the standard's surface and its beveled edges, substantially as set forth.

5. In a tool of the kind described the combination of a standard; one or more arms flexibly connected therewith; one or more pairs of tool-guides carried by each arm, one of which guides is to remain laterally parallel with the standard, longitudinally of the standard, and the other of which is adjustable to and from the former; means for adjustably varying the space between the members of each pair of guides, such space-varying means acting longitudinally of the respective arm; and means for pressing each adjustable guide against such space-varying means: substantially as set forth.

6. In a tool of the kind described the combination of a standard and one or more pairs of tool-guides flexibly connected therewith; one guide in each pair being rigid laterally, parallel with the standard longitudinally, and the other of which is movable from and toward the former, or rocked with relation to it so that it may be made parallel to or to converge toward or diverge from the other and the standard (looking upward or downward), by means of a variable headed screw that operates between each such pair of guides, said movable guide being forced toward the other so as to tighten it against said screw, by a laterally-disposed actuating means: substantially as described.

7. In a tool of the kind described, the combination of a standard; one or more arms hinged thereto; one or more pairs of tool-guides slidable vertically with relation to each arm, the inner guide in each pair remaining parallel with the standard and the outer guide capable of lateral adjustment—parallel, convergently, or divergently—with relation to the other, and means for firmly securing said guides in said vertical and lateral adjustments: substantially as set forth.

8. In a tool of the kind described, a standard; an arm in hinge relation therewith; one or more pairs of tool-guides disposed transversely of the arm, and adjustable vertically and laterally with relation thereto; and means to effect these adjustments such as a screw acting longitudinally of the arm between each pair of guides; and a screw operating transversely of the arm and against one of the guides: substantially as set forth.

9. In such a tool the combination of a standard, having a rule impressed upon one face thereof for convenience in placing crown and bed molding and similar obliquely-disposed stock at the proper slant and elevation, while being operated upon; one or more arms flexibly connected with the standard; one or more pairs of tool-guides carried by each arm and vertically and horizontally adjustable thereon; means for effecting these adjustments and for moving and rocking one guide in each pair toward or away from the other in convergent, divergent, or parallel relation thereto; and an actuator for each rocking guide to bring and hold it in a required position against the rocking means, as well as to positively maintain both guides (of the pair) firm in their beforesaid adjustments: substantially as described.

10. In a tool of the kind described, the combination of a standard, an arm flexibly connected therewith, and a line of tool-guides carried by said arm, one or more guides in the line being movable to or away from the arm, transversely, substantially as described.

11. In a tool of the kind described, the combination of a standard, an arm flexibly connected therewith, two pairs of tool-guides carried by said arm, and means for rocking the pair of guides remote from the standard transversely, with relation to the arm, or, out of parallelism with the pair of guides adjacent to the standard, substantially as described.

12. In a tool of the kind described, the combination of a standard, an arm flexibly connected therewith, two or more pairs of tool-guides, a guide in each pair having depressions, a conical screw or wedge engaging said depressions, and means for pressing one guide toward the other and upon the intervening screws, substantially as described.

Signed at San Francisco this 4th day of March, 1901.

JOHN MICHAEL JOSEPH PHELAN.

Witnesses:
JOHN P. CASHIN,
E. W. HORNE.